(12) United States Patent
Bystrom et al.

(10) Patent No.: US 12,468,753 B2
(45) Date of Patent: *Nov. 11, 2025

(54) SYSTEMS AND METHODS FOR SELECTING DIGITAL DATA FOR ARCHIVAL

(71) Applicant: Bevara Technologies, LLC, Watertown, MA (US)

(72) Inventors: Maja Bystrom, Watertown, MA (US); Jerome Gorin, Paris (FR)

(73) Assignee: Bevara Technologies, LLC, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,219

(22) Filed: Dec. 15, 2023

(65) Prior Publication Data

US 2024/0232251 A1 Jul. 11, 2024

Related U.S. Application Data

(60) Continuation of application No. 17/466,859, filed on Sep. 3, 2021, now Pat. No. 11,847,155, which is a
(Continued)

(51) Int. Cl.
*G06F 16/44* (2019.01)
*G06F 11/14* (2006.01)
(Continued)

(52) U.S. Cl.
CPC .......... *G06F 16/44* (2019.01); *G06F 11/1448* (2013.01); *G06F 16/113* (2019.01);
(Continued)

(58) Field of Classification Search
CPC ............ H04N 21/482; H04N 21/2365; H04N 21/4316; H04N 9/8205; H04N 19/40; H04N 19/44; G06F 21/10; G06F 16/113
(Continued)

(56) References Cited

U.S. PATENT DOCUMENTS 5,210,832 A * 5/1993 Maier .................. G06F 9/3017
712/E9.037
5,987,181 A 11/1999 Makiyama et al.
(Continued)

FOREIGN PATENT DOCUMENTS

EP 1562193 A1 8/2005
EP 1818907 A1 8/2007
(Continued)

OTHER PUBLICATIONS

Angus, Andrew. "Dropbox: Video Sharing and Photo Sharing Made Easy" [blog post] http://www.switchvideo.com/blog/2011/05/09/dropbox-video-sharing-and-photo-sharing-madeeasy/ May 9, 2011 (May 9, 2011) Switch Video. Retrieved on Mar. 14, 2013, 5 pages.
(Continued)

*Primary Examiner* — Hung T Vy
(74) *Attorney, Agent, or Firm* — Veros Legal Solutions, LLP

(57) ABSTRACT

Data processing engines are provided that include an electronic display, a decoding functionality selector, a decoding functionality generator in communication with the decoding functionality selector, and a decoding functionality verifier, each configured as described anywhere herein. Related methods of automatically constructing platform-independent decoders for encoded digital data encoded in particular formats are also provided as described anywhere herein.

1 Claim, 7 Drawing Sheets

Related U.S. Application Data continuation of application No. 16/027,565, filed on Jul. 5, 2018, now Pat. No. 11,113,329, which is a division of application No. 14/714,031, filed on May 15, 2015, now Pat. No. 10,025,787.

(60) Provisional application No. 61/994,757, filed on May 16, 2014.

(51) Int. Cl.
| | |
|---|---|
| G06F 16/11 | (2019.01) |
| G06F 16/25 | (2019.01) |
| G06F 16/54 | (2019.01) |
| G06F 16/74 | (2019.01) |
| H04N 21/231 | (2011.01) |
| H04N 21/81 | (2011.01) |
| H04N 21/2343 | (2011.01) |
| H04N 21/854 | (2011.01) |

(52) U.S. Cl.
CPC ............ *G06F 16/258* (2019.01); *G06F 16/54* (2019.01); *G06F 16/74* (2019.01); *H04N 21/23109* (2013.01); *H04N 21/8193* (2013.01); *H04N 21/234309* (2013.01); *H04N 21/85406* (2013.01)

(58) Field of Classification Search
USPC .......................... 707/661; 386/328, 344, 214
See application file for complete search history.

(56) References Cited

U.S. PATENT DOCUMENTS

| | | | |
|---|---|---|---|
| 6,181,711 B1 | 1/2001 | Zhang et al. | |
| 6,624,761 B2 | 9/2003 | Fallon | |
| 7,512,986 B2 | 3/2009 | Shen-Orr et al. | |
| 7,646,432 B2 | 1/2010 | Park et al. | |
| 7,647,619 B2 | 1/2010 | Kashima | |
| 8,995,534 B2 | 3/2015 | Richardson et al. | |
| 9,369,717 B2 | 6/2016 | Richardson et al. | |
| 9,667,685 B2 | 5/2017 | Bystrom et al. | |
| 10,025,787 B2* | 7/2018 | Bystrom .............. G06F 16/113 | |
| 2002/0010859 A1 | 1/2002 | Maeda | |
| 2002/0018580 A1 | 2/2002 | Maeda | |
| 2002/0035544 A1 | 3/2002 | Wakao et al. | |
| 2002/0087999 A1 | 7/2002 | Kashima | |
| 2003/0002854 A1* | 1/2003 | Belknap ............. H04N 21/6587 707/E17.028 | |
| 2003/0163430 A1 | 8/2003 | Takaku | |
| 2003/0193940 A1 | 10/2003 | Kugumiya | |
| 2003/0206717 A1* | 11/2003 | Yogeshwar ............. G06F 16/71 386/328 | |
| 2004/0028141 A1 | 2/2004 | Hsiun et al. | |
| 2004/0067043 A1 | 4/2004 | Duruoz et al. | |
| 2004/0221143 A1 | 11/2004 | Wise et al. | |
| 2006/0056506 A1 | 3/2006 | Ho et al. | |
| 2006/0087457 A1 | 4/2006 | Rachwalski et al. | |
| 2006/0116966 A1 | 6/2006 | Pedersen et al. | |
| 2006/0123455 A1 | 6/2006 | Pai et al. | |
| 2006/0227815 A1 | 10/2006 | Khan | |
| 2006/0248235 A1 | 11/2006 | Eyer | |
| 2006/0257103 A1* | 11/2006 | Lim ......................... H04N 5/76 386/214 | |
| 2007/0013562 A1 | 1/2007 | Fujinami et al. | |
| 2007/0200658 A1 | 8/2007 | Yang | |
| 2007/0274340 A1 | 11/2007 | Raveendran et al. | |
| 2007/0296613 A1 | 12/2007 | Hussain et al. | |
| 2008/0027953 A1 | 1/2008 | Morita et al. | |
| 2008/0052540 A1 | 2/2008 | Inokuchi et al. | |
| 2008/0066181 A1 | 3/2008 | Haveson et al. | |
| 2008/0181400 A1 | 7/2008 | Guleryuz et al. | |
| 2008/0243995 A1 | 10/2008 | Dong et al. | |
| 2008/0252490 A1 | 10/2008 | Chiluk et al. | |
| 2008/0294691 A1 | 11/2008 | Chang et al. | |
| 2009/0016446 A1 | 1/2009 | Yang et al. | |
| 2009/0086104 A1 | 4/2009 | Felder | |
| 2009/0110067 A1 | 4/2009 | Sekiguchi et al. | |
| 2009/0142038 A1 | 6/2009 | Nishikawa | |
| 2009/0154556 A1 | 6/2009 | Kim et al. | |
| 2009/0304115 A1 | 12/2009 | Pittaway et al. | |
| 2009/0310671 A1 | 12/2009 | Reynolds et al. | |
| 2009/0313300 A1 | 12/2009 | Dettori et al. | |
| 2010/0027974 A1 | 2/2010 | Ansari | |
| 2010/0046627 A1 | 2/2010 | Xiao et al. | |
| 2010/0195820 A1 | 8/2010 | Frank | |
| 2011/0061086 A1 | 3/2011 | Huang | |
| 2012/0069910 A1 | 3/2012 | Richardson et al. | |
| 2012/0069911 A1 | 3/2012 | Richardson et al. | |
| 2012/0072225 A1 | 3/2012 | Richardson et al. | |
| 2012/0250757 A1 | 10/2012 | Mabey et al. | |
| 2012/0323758 A1 | 12/2012 | Henning | |
| 2013/0103786 A1 | 4/2013 | Miglore | |
| 2013/0188739 A1 | 7/2013 | Bystrom et al. | |
| 2013/0195171 A1 | 8/2013 | Wang et al. | |
| 2014/0126883 A1 | 5/2014 | Yogeshwar et al. | |
| 2014/0317668 A1 | 10/2014 | Zhang et al. | |
| 2014/0380113 A1 | 12/2014 | Luby et al. | |
| 2015/0195325 A1 | 7/2015 | Bystrom et al. | |

FOREIGN PATENT DOCUMENTS

| | | |
|---|---|---|
| EP | 1912129 A3 | 9/2010 |
| WO | 2005046058 A1 | 5/2005 |
| WO | 2008127080 A1 | 10/2008 |

OTHER PUBLICATIONS

Avaro et al., "The MPEG-4 Systems and Description Language: A Way Ahead in Audio Visual Information Representation", Signal Processing: Image Communication (1997) 9(4): 385-431.

Bystrom et al., "A Fully Re-Configurable Universal Video Decoder", Conference on Design & Architectures for Signal & Image Processing (DASIP) 2009, 7 pages.

Chen et al., "Active Techniques for Real-Time Video Transmission and Playback", 2000 International Conference on Communications, New Orleans, LA Jun. 18-21, 2000 IEEE New York, NY; pp. 239-243.

Ding et al., "Reconfigurable video coding framework and decoder reconfiguration instantiation of AVS", Signal Processing, Image Communication (2009) 24(4): 287-299.

European Telecommunications Standards Institute, Technical Specifications: Hybrid Broadcast Broadband TV, ETSI TS 102 796 (2012); 88 pages.

Gorin et al., Optimized dynamic compilation of dataflow representations for multimedia applications, Annal Telecommun, Springer Verlag (2013) 68(3-4); 133-151.

Gorn et al. "Just-In-Time Adaptive Decoder Engine: A Universal Video Decoder based on MPEG RVC", Proc 19th ACM Inter'l Conference on Multimedia, New York, NY—USA (2011), 4 pages.

International Preliminary Report on Patentability dated Mar. 22, 2013 for Application No. PCT/US2011/052401, filed Sep. 20, 2011.

International Preliminary Report on Patentability issued in International Patent Application No. PCT/US2011/052394 on Feb. 19, 2013.

International Preliminary Report on Patentability issued in International Patent Application No. PCT/US2011/052396 on Feb. 12, 2013.

International Preliminary Report on Patentability issued in International Patent Application No. PCT/US2015/031199 on Sep. 21, 2016.

International Search Report and the Written Opinion issued in International Patent Application No. PCT/US2013/023019 on Apr. 12, 2013.

International Search Report and the Written Opinion issued in International Patent Application No. PCT/US2015/031199 on Aug. 31, 2015.

International Search Report and Written Opinion issued in International Patent Application No. PCT/US2011/052396 on Jan. 24, 2012.

(56) References Cited

OTHER PUBLICATIONS

International Search Report dated Jan. 17, 2012 for Application No. PCT/US2011/052401, filed Sep. 20, 2011.
International Search Report issued in International Patent Application No. PCT/US2011/052394 on Feb. 7, 2012.
ISO/IEC 14496-12 Information Technology—Coding of Audio-Visual Objects—Part 12 ISO base media file format; International Organization for Standardization—4th Edition (2012); 196 pages.
ISO/IEC 14496-14 Information technology—Coding of audio-visual objects—Part 14 MP4 file format; International Organization for Standardization—1st Edition (2003); 18 pages.
Jang et al., "Reshaping Digital Media Business Models by Reconfigurable Video Coding", 78. MPEG Meeting; Oct. 23-Oct. 27, 2006; Hangzhou; (Motion Picture Expert Group or ISA/IEC JTC1/SC29/WG11); No. M13907, 5 pages.
Kannangara et al., "A Syntax for Defining, Communicating, and Implementing Video Decoder Function and Structure" IEEE Transactions on Circuits & Systems for Video Tech. (2010) 20(9):1176-1186.
OneCodec. "OneCodec: Future proof your media." (online) Sep. 23, 2011 1-10, 13-15 (Sep. 23, 2011) Available at http://vimeo.com/29476212. Retrieved on Mar. 14, 2013, 2 pages.
Partial International Search Report issued in International patent Application No. PCT/US2015/030525 on Jul. 27, 2015.
Philp et al., "Decoder Description Syntax for Fully Configurable Video Coding", ICIP, Nov. 2009, pp. 769-772.
Richardson et al., "A Framework for Fully Configurable Video Coding", Picture Coding Symposium, PCS 2009, 4 pages.
Richardson et al., "Dynamic transform replacement in an H.264 Codec", 15th IEEE International Conference on Image Processing (ICEP 2008) pp. 2108-2111.
Richardson et al., "Fully Configurable Video Coding—Part 1: Overview of FCVC", ISO/IEC JTCI/SC20/WG11 document M16751, Jun. 2009, 6 pages.
Richardson et al., "Fully Configurable Video Coding—Part 2: A Proposed Platform for Reconfigurable Video Coding", ISO/IEC JTCI/SC20/WG11 document M16752, Jun. 2009, (London, UK) 5 pages.
Richardson et al., "Implementing Fully Configurable Video Coding", 16th IEEE International Conference on Image Processing (ICIP) Nov. 2009, pp. 765-768.
Written Opinion issues in International Patent Application No. PCT/US2015/031199 on May 2, 2016.
Zhao et al., "A Random Access Protocol for Configurable Video Coding", 90th MPEG Meeting; Oct. 26-Oct. 30, 2009; Xian; (Motion Picture Expert Group or ISO/IEC JTC1 /SC29/WG11 ), No. M16927.

* cited by examiner

| | | |
|---|---|---|
| 302 — ☐ | Accessor 1 | 6.0MB |
| 304 — ☐ | Accessor 2 | 2.0MB |
| 306 — ☐ | Rotating Display | 0.7MB |
| | ☐ 2D Rotation —308 | 0.2MB |
| | ☐ 3D Rotation —310 | 0.5MB |
| 312 — ☐ | Annotation Display | 0.01MB |
| | 314 — Total | MB |

SYSTEMS AND METHODS FOR SELECTING DIGITAL DATA FOR ARCHIVAL

CROSS REFERENCE TO RELATED APPLICATIONS

This application is a continuation of U.S. Non-Provisional application Ser. No. 17/466,859, filed Sep. 3, 2021, entitled SYSTEMS AND METHODS FOR SELECTING DIGITAL DATA FOR ARCHIVAL, which application is a continuation of Ser. No. 16/027,565, filed Jul. 5, 2018, entitled SYSTEMS AND METHODS FOR SELECTING DIGITAL DATA FOR ARCHIVAL, which is a divisional of U.S. Non-Provisional Application Ser. No. 14/714,031, filed 15 May 2015, entitled SYSTEMS AND METHODS FOR SELECTING DIGITAL DATA FOR ARCHIVAL, which claims priority to U.S. Provisional Application No. 61/994,757, filed 16 May 2014, and is assigned to the assignee hereof. The disclosure of all prior applications described herein are considered part of this application and are, hereby, incorporated by reference in their entirety.

This application is also related to U.S. application Ser. No. 13/212,127, filed Aug. 17, 2011, now U.S. Pat. No. 8,995,534, U.S. application Ser. No. 13/237,673, filed Sep. 20, 2011, and U.S. application Ser. No. 14/280,499, filed May 16, 2014. The disclosures of these prior applications are hereby incorporated by reference in their entirety.

BACKGROUND

Field

The present technology relates to systems and methods for accessing digital data. More particularly, the technology relates to computer architecture and operating methods that can enable decoders or players to access digital data.

Description of the Related Art

Digital data capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, data servers, and the like. Digital devices implement image and video encoding techniques or formats such as JPEG, GIF, RAW, TIFF, PBM, MPEG-2, MPEG-4, and H.264/MPEG-4, Part 10, Advanced Video Coding (AVC), to store, transmit and receive digital images and video efficiently. Digital devices implement audio encoding techniques or formats such as, AAC, MP3, and WAV to store, transmit, and receive digital audio efficiently. Digital devices implement additional data and graphics encoding techniques or formats such as IGES, 3DT, PS, MNG, ODF, HDF5, NetCDF, and SVG. Digital devices implement document, spreadsheet, and presentation formats such as PowerPoint, PDF, Microsoft Word, Microsoft Excel, and the like. Digital devices further implement proprietary data storage formats for storage of scientific or other data.

Digital data are commonly encoded prior to transmission or storage by an encoder, e.g., a server. The encoding typically consists of operations such as compression or organization into a selected format. The digital data may be independently stored or provided to a user. Alternatively, the digital data may be embedded in other digital data. For instance, an image, video, data, or animation may be part of an electronic news article, electronic slideshow, or technical paper. In either case, the digital data must be accessed, that is, decoded or interpreted prior to display or play by accessors resident on devices such as mobile devices, DVD players, Blu-Ray players, TV sets, tablets, laptops, computers, or set top boxes. However, a particular accessor may not support decoding or interpreting of the format used by the encoder. For example, the format used by the encoder may be a legacy format no longer supported or may be a new format that the accessor does not yet support. This presents challenges to the content generator or archivist who wishes to ensure that the digital data are always accessible.

Since different access techniques may support different formats, the traditional solutions are to either: encode the digital data in many different formats to support many different decoders/interpreters; or to select a single format in which to encode a particular type of data. As examples of the latter approach, all images may be converted to a GIF format, or all text documents may be converted to rich text format or pdf format. In both cases, decoding and re-encoding of digital data can lead to loss in quality and content. Furthermore, the former case requires additional storage for the copies of the data in the various formats, while the latter case relies on a single accessor, that is, player or interpreter, always being supported on all platforms.

Fully Configurable Video Coding is a new approach to video codec implementation that builds on the strengths of MPEG RVC and adaptive video coding techniques. A common platform-independent decoding engine, can be configured to decode any video sequence or syntax. An encoder sends a set of configuration commands which define a video decoding process in terms of a set of primitive operations and interconnections. The decoding engine receives these configuration commands and creates corresponding decoding objects to implement the required decoding functions. Video is then decoded by stepping through these decoding objects. This approach is more fully described in Bystrom, et al, A Fully Re-Configurable Universal Video Decoder, presented at the Design and Architectures for Signal and Imaging Processing Conference in 2009, which is hereby incorporated by reference in its entirety. Additional work was discussed in Richardson, et al, A Framework for Fully Configurable Video Coding, presented at the Picture Coding Symposium in 2009, which is also hereby incorporated by reference in its entirety.

SUMMARY

The systems, methods, and devices described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, enabling decoders to decode unsupported data formats.

One aspect of this disclosure is a data processing engine. The data processing engine comprises a format analyzer configured to determine the format and features of encoded data. The engine also includes a functionality generator in communication with the format analyzer. The functionality generator is configured to generate functionality for accessing the encoded data. The functionality generator is further configured with a user interface to assist the user in selecting levels of functionality to be generated and a user interface to assist the user in selecting encoded data to be packaged with the generated functionality.

Another aspect of this disclosure is a data processing engine comprising a functionality interpreter. The functionality interpreter is configured to receive the generated data corresponding to a functionality. The functionality interpreter is further configured to generate the functionality based on the data. The engine also includes a functionality instantiator. The functionality instantiator is configured to generate an accessor based on the functionality. The accessor is configured to decode or interpret digital data.

Another aspect of this disclosure is a verifier. The verifier is configured to decode or interpret digital data using a pre-selected accessor. It is further configured to compare the decoded/interpreted data from the pre-selected accessor with the decoded/interpreted data from the instantiated accessor.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 3A is an example graphical user interface illustrating a functionality selector that performs techniques as described in this disclosure.

DETAILED DESCRIPTION

The following detailed description is directed to certain specific embodiments. However, the teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Figure 1:
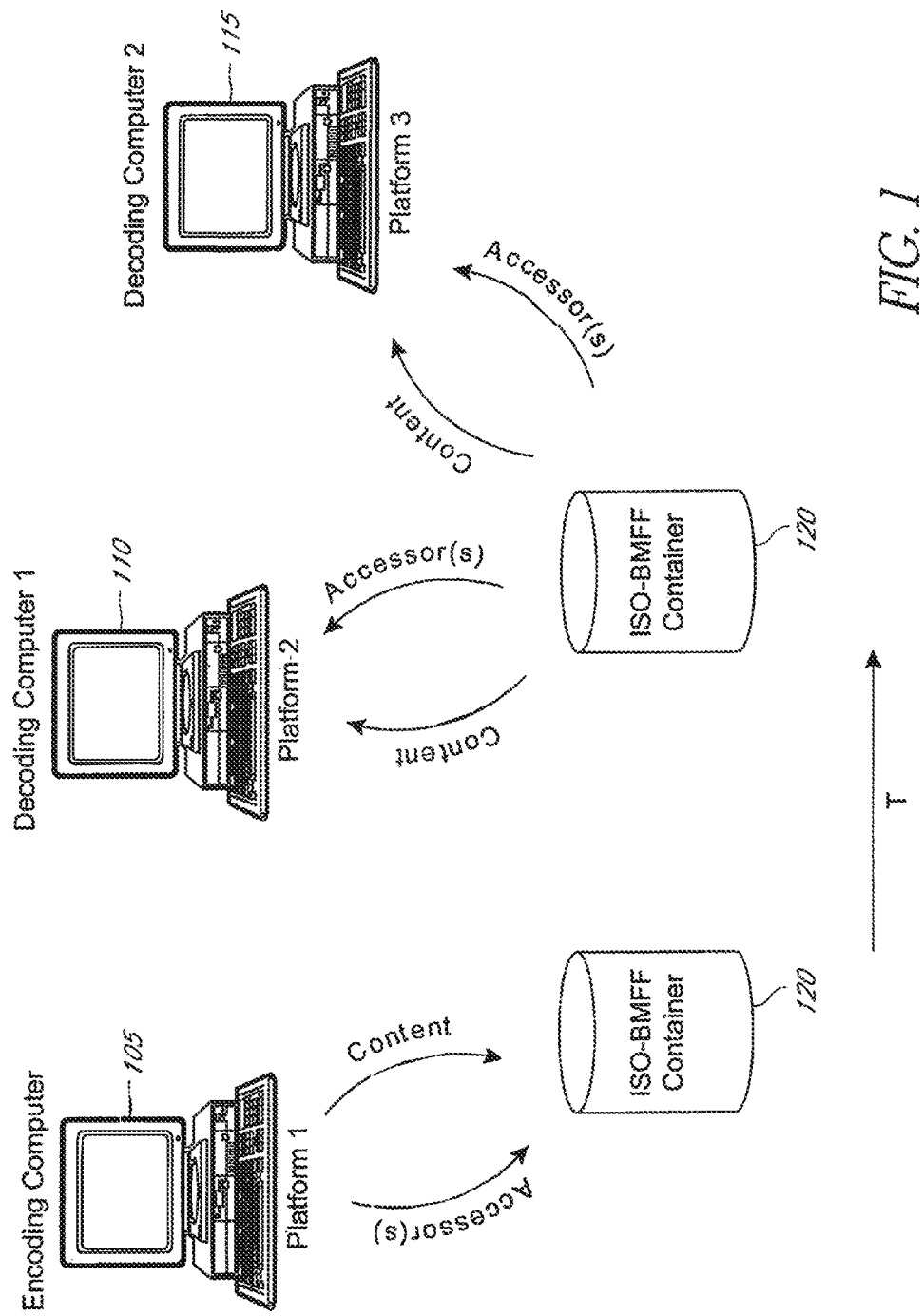
FIG. 1 is an overview diagram of a system for long term archival of electronic content.

FIG. 1 is an overview diagram of a system for long term archival of electronic content. The overview shows an encoding computer 105 and two decoding computers 110 and 115. The encoding computer 105 and/or decoding computers 110 and 115 may be any digital device with at least an electronic processor.

The encoding computer receives or prepares a file, which may be referred to herein as a "container" and stores the container in a data store 120. A container is a metafile format whose specification describes how different data elements and metadata coexist in a computer file. Among them, the ISO base media file format (BMFF) is designed as a flexible extensible format that facilitates interchange, management, editing and presentation of media and serves as the basis of other media file formats such as MP4 and 3GP. It is organized to store any kind of digital media, primarily video and audio, through a set of tracks. Note that while FIG. 1 shows data stored in a BMFF format, the disclosed methods and systems are not limited to the BMFF format. For example, some aspects may utilize a WAV format or Matroska format.

The encoding computer may store both content and accessor data for that content within the container. The accessor data may implement platform independent algorithm(s) for accessing the content. For example, if the content is an audio/video file, the accessor data may define an accessor that is a player for the audio/video file. If the content is a word processing file, the accessor may define at least a basic word processing program that can read and interpret the word processing file and possibly prepare it for display. In some cases, the encoding computer 105 may store multiple accessors for the content in the container.

For example, in one aspect the presentation data or content stored to the container may be scientific data. Two engineers may each develop separate programs to operate on the scientific data. Using the disclosed methods and systems, the scientific data may be packaged as presentation data or content in the container. Each of the programs developed by the two engineers may also be packaged as separate platform independent accessors for the content. In some aspects, two or more separate sets of content may be packaged in the container by the encoding computer. Each of these two separate sets of content may have their own accessor(s), also packaged within the same container. In another example, the content may comprise several different types of content, such as a Word document with an embedded image file, or a PowerPoint presentation with an embedded animation.

After substantial time "T" passes, one or both of the decoding computers 110 and 115 may each read and decode the container. "T" may be an amount of time that traditionally presents challenges in preserving and/or maintaining an ability to access archived data. For example, "T" may be 50 or 100 years in some aspects. The decoding computers 110 and 115 may extract the one or more content and their associated accessor(s) from the container. The accessors may then be invoked using an accessor execution engine installed, in some aspects, on each of the decoding computers. For example, the accessor execution engine installed on the decoding computers may be a virtual machines such as a Java virtual machine (e.g. the accessor data is Java byte codes), common language runtime (e.g. the accessor data is common intermediate language (CIL), or other intermediate language interpreter. In some aspects, the accessor execution engine may implement a "just-in-time" or "ahead-of-time"

compiler of programming language statements defined by the accessor data. In some aspects, the accessor execution engine may be an ANSI "C" compiler, with the accessor data defining "C" language source code.

In some other aspects, the accessor execution engine installed on the decoding computers may be a source code level interpreter, such as a basic interpreter (e.g. the accessor data defines basic language source code), perl interpreter (e.g. the accessor data defines perl source code), or python interpreter (e.g. the accessor data defines python source code). In yet other aspects, the accessor execution engine may be a hardware configuration engine, such as for FPGAs. When invoking the accessors retrieved from the container, the decoding computers 110 and 115 may pass the relevant content in the container to the accessors as an input parameter, such that the accessors can process the content.

In an archiving application, the combination of the digital data, associated metadata, and any associated accessors may still require significant amounts of storage space. Therefore methods and systems are needed to manage the storage requirements for archiving particular types of data. One approach is to provide for selection of appropriate subsets of each of these types of data. For example, digital data forming the content to be stored in a container may include "n" different types of data, such as video and audio, text and image, or other combinations. Each type of data may be in a different encoded format, and thus may require one or more different algorithms or accessors for interpreting the data type. By selecting a subset of the "n" different types of data for archival, the size required for archival is reduced by elimination of data for types that are not selected, as well as making possible the elimination of accessors for those same unselected data types.

When either all or only a portion of the digital data (and any corresponding accessors) are selected for archival, methods and systems may also be needed to verify that the selected subsets of data and accessor functionality are adequate to reproduce the digital data and metadata in the intended format(s).

More specifically, some aspects may select both accessor functionality and a corresponding subset of data and, optionally, associated metadata, to be stored. A space-constrained user, such as a digital archive or content provider, may not wish to store the entire stream of encoded data. As examples, closed captions of video, embedded video in presentations, formatting in text files, scientific data annotations, or portions of embedded or external metadata associated with the data may be deemed unnecessary and may be discarded. Similarly, for archiving purposes, it may be desirable to keep all of the digital data content, but only to provide accessor functionality for portions of the content. Disclosed are methods and systems for selection of subsets of accessors and/or accessor functionality, subsets of digital data content, and subsets of associated metadata. In some aspects, the selection may be based, in part, on the storage space required for each subset. Further disclosed are automatic or user-supervised verification of the selected accessor functionality.

Various embodiments of systems and methods are described herein for encoding and decoding/interpreting digital data and/or functionality. In the embodiments described herein, the systems and methods may allow digital data to be encoded and decoded/interpreted in a more efficient manner. For example, the systems and methods described herein may allow for configuration/selection of a subset of accessors from a larger list of possible accessors, with the subset of accessors supporting decoding/interpreting of a subset or all of a set of data formats included in digital data being archived. Further, the systems and methods may allow for any type of configuration, without requiring replacement of the decoder/interpreter hardware or download of new configuration data from an alternate data source other than the data provided with the digital data.

In one embodiment, the systems and methods described herein may include a data analyzer/functionality generator configured to determine the format and/or features of encoded data, select or configure functionality for accessing encoded data, and then retrieve or generate syntax elements (e.g., codewords) that are used to configure an accessor as further discussed below. It should be noted that certain embodiments described below may reference codewords, however, other syntax elements may be similarly used. The systems and methods described herein further correspond to an accessor instantiator for digital data decoding/interpreting and comparison to output of a pre-selected accessor.

Figure 2A:
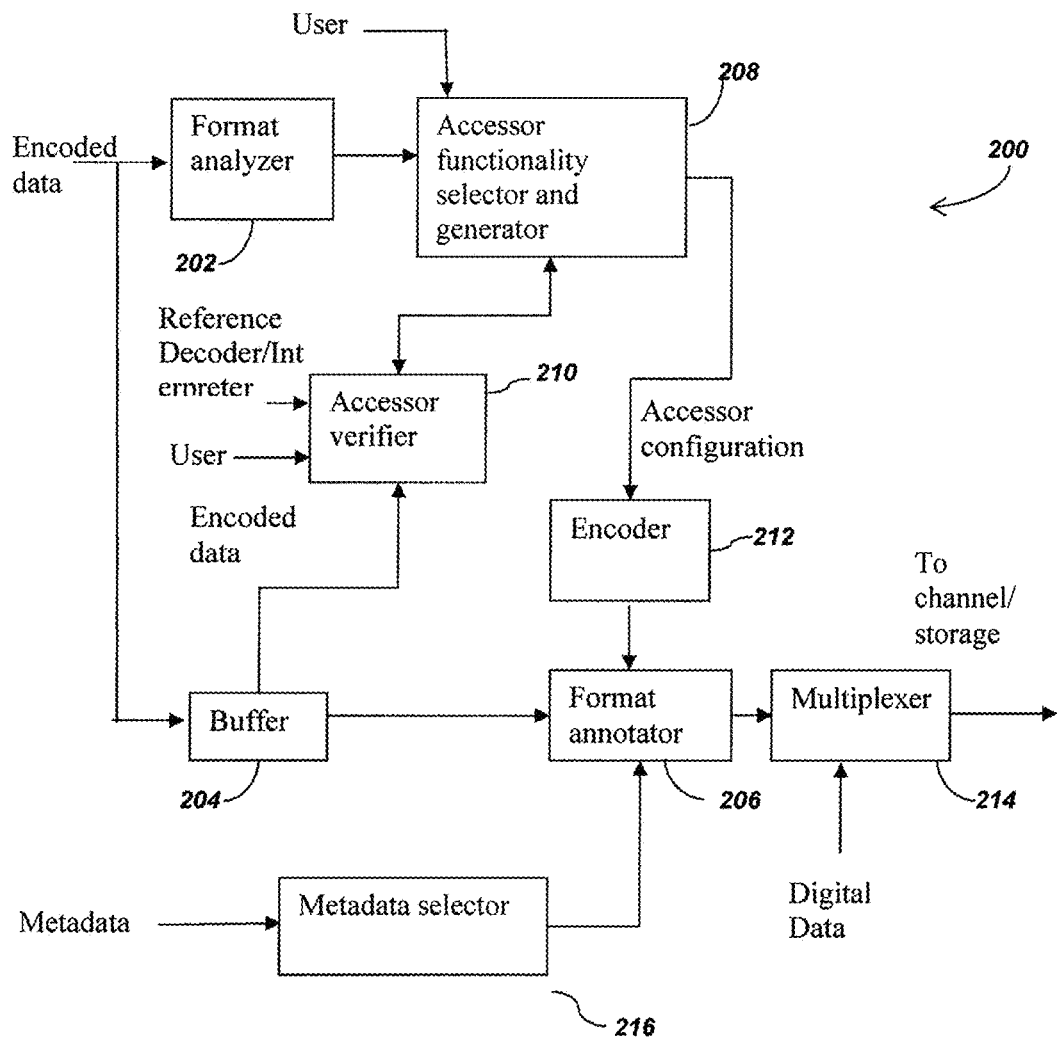
FIG. 2A is a block diagram illustrating a data analyzer/functionality generator that performs techniques as described in this disclosure.

FIG. 2A is a block diagram illustrating a data analyzer/functionality generator 200 that performs techniques as described in this disclosure and which may be present in the encoding computer 105 of FIG. 1. In some aspects, the data analyzer/functionality generator 200 shown in FIG. 2A may be implemented via electronic processing hardware, such as one or more general purpose processors, field programmable gate arrays, digital signal processors, or the like. For example, each of the blocks shown in FIG. 2A may comprise instructions that configure the one or more electronic hardware processors to perform the functions described below.

The data analyzer/functionality generator 200 includes a format analyzer 202 and an optional first buffer 204 each configured to receive digital data. The optional first buffer 204 is optionally in communication with a format annotator 206. The optional first buffer 204 is further optionally in communication with an optional accessor verifier 210. The format analyzer 202 is in communication with an accessor functionality selector and generator 208. The accessor functionality selector and generator 208 is optionally in communication with an optional source/channel/encryption encoder 212 and is further in communication with the optional accessor verifier 210. Alternatively, or additionally, the accessor functionality generator 108 is directly in communication with the format annotator 206. The data analyzer/functionality generator may optionally include a metadata selector 216 optionally in communication with format annotator 206. The format annotator 206 is optionally in communication with a multiplexer 214. The functionality of the components of the data analyzer/functionality generator 200 is discussed in detail below.

The format analyzer 202 is configured to receive encoded digital data. The format analyzer 202 is configured to analyze the encoded digital data in order to determine the format in which the data are encoded. For example, the format analyzer 202 may compare the encoded data against structures stored in a library such as a local library (e.g., a local memory store) of the format analyzer 202 or a non-local library (e.g., network storage), where different structures are associated with different formats. The structures may include, for example, file names, stream headers, formatting codes, magic numbers, MIME types, file extensions, etc. Based on the comparison to the structures, if a format with matching structures is found, the format analyzer 202 determines the default format of the encoded data or portions of the encoded data. If matching structures are not found, the format analyzer may determine that the data are encoded in an unknown format. The format analyzer may further be configured to determine presence and formats of features or components present in the encoded data. As examples, an encoded video stream may contain closed captions while an encoded audio stream may contain embedded lyrics. As additional examples, a slide show may contain embedded video while scientific data may contain embedded annotations. One of ordinary skill in the art should recognize that the format analyzer 202 may be configured to compare and/or analyze the data to determine a format in other manners as well. The format analyzer 202 further provides information about the detected format(s) or a signal indicating an unknown format to the accessor functionality selector and generator 208. In an alternate embodiment the format analyzer 202 may be configured to additionally receive a second encoded data stream so that multiple streams may be processed in serial or in parallel. The format analyzer 202 is configured to analyze the second encoded data stream in order to determine the format in which the second encoded data stream is encoded. The format(s) included in the second encoded stream may differ from those of the first encoded stream. The format(s) of the second stream is also provided to the accessor functionality selector and generator 208 by the format analyzer 202.

The accessor functionality selector and generator 208 is configured to receive information about a detected format (or a signal indicating an unknown format) within a data stream from the format analyzer 202. In some aspects, the accessor functionality selector and generator 208 may receive a plurality or a set of indicators of different formats detected within one or more data streams, for example, associated with different types of components of a multimedia file. The accessor functionality selector and generator 208 may then process each of the plurality of detected formats, either serially or in parallel in various aspects.

The accessor functionality selector and generator 208 may have access to a datastore that includes definitions of an association between one or more of the indicated formats and one or more accessors. If a particular detected format is known, then the accessor functionality selector and generator 108 may identify one or more functionalities associated with the detected format via the data store. The functionalities may define algorithms capable of accessing and/or decoding the detected format. For example, if one of the indicated formats is a .wav format, the accessor functionality selector and generator 208 may retrieve an association between .wav and one or more accessors capable of decoding and/or playing a .wav file. The functionalities may further be stored in a local library or a non-local library. These functionalities may be stored in an intermediate format, such as LLVM bitcode, to ensure that they are platform-independent. Alternatively, the functionalities can be stored in a software or hardware language, such as C, Java, C#, or VHDL, but must be translated to an intermediate format to provide for platform independence.

In some aspects, the accessor functionality selector and generator 208 may then select one or more particular functionalities based on the identified functionalities that are capable of decoding the detected format. In one embodiment, the accessor functionality selector and generator 208 has only one functionality to select from the library for a particular format, and thus, no choice between multiple formats may be required.

In some embodiments, the accessor functionality selector and generator 208 is configured to receive input from an input device defining a selection of a subset of all the functionality available. For example, in some aspects, the selection may be received from a human user from an input device such as a keyboard and/or pointing device. In some aspects, the selection may be received from a configuration data store, such as a configuration file or a database.

In some aspects, the accessor functionality selector and generator 208 is configured to receive input from an input device defining a selection of a subset of data formats. Using the association datastore discussed above, the accessor functionality selector and generator 208 may identify one or more accessors associated with the selected data formats. The accessor functionality selector and generator 208 may then select one or more accessors for use in an archival operation for the selected data formats. Thus, not all the data formats available within a particular data stream may be selected for archival. Given an association between data formats and accessors, the accessor functionality selector and generator 208 may determine a subset of accessors to include within a particular archive based on a subset of selected data formats.

In some embodiments the accessor functionality selector and generator 108 may be configured to receive information about a second detected format(s) within the first data stream or within a second input encoded data stream from the format analyzer 202. The accessor functionality selector and generator 208 may be configured to process the information about the detected formats in parallel or in serial.

In another embodiment, the accessor functionality selector and generator 208 may display a list of subcontent of the encoded data and permit the user to select portions of the content to store with the generated accessor functionality by the format annotator 206. As an example, in an embodiment archiving an electronic document including both text and text formatting information, the acessor functionality selector may provide for the selection of only text information and no formatting information to be stored. As a second example, in a presentation that includes both text and embedded video or animations, the text may be selected for archival while the embedded video or animations may be selected to not be archived.

In a further embodiment, the accessor functionality selector and generator 208 has multiple functionalities to select from the library per format. For example, a particular data format may be decodable by a plurality of accessors. Some of the accessors may provide more robust decoding capabilities but may require more space in an archive than an accessor with less robust features. Depending on the requirements for a particular archive, some functionalities may be deemed unnecessary given the features for a given data set.

Licensing costs may also vary for one or more of the functionalities and/or accessors. In some aspects, the accessor functionality selector and generator 208 may be configured to display one or more accessors and their associated licensing costs. A user may then be able to select one or more accessors based on the associated licensing costs. For example, in the case of a particular video clip, it may be deemed that the decoding of closed captions is unneeded, especially given a licensing cost associated with an accessor configured to decode and play back closed captions. In the case of audio, it may be determined that interpreting and display of embedded lyrics is unneeded. In the case of slide presentations, it may not be necessary to include decoder functionality for embedded video or interpretation and display functionality for notes. Similarly, in the case of text documents it may be deemed necessary to include only text display and not text manipulation functionality in the accessor.

In some aspects, the accessor functionality selector and generator 208 may be configured to display type information for an accessor and/or functionality. For example, in some aspects, the type information may indicate whether an accessor and/or functionality is proprietary or non-proprietary. In some aspects, the selector and generator 208 may be configured to display the type information to a user before receiving selection input from a user. In some other aspects, the selector and generator 208 may be configured to read configuration information that controls how accessors are automatically selected based on the type information. For example, in some aspects, a selection rule may be specified that indicates propriety accessors should be selected over non-proprietary accessors when both types of accessors are available for a particular data type. The selection rule may then be executed by the selector and generator 208.

Figure 2B:
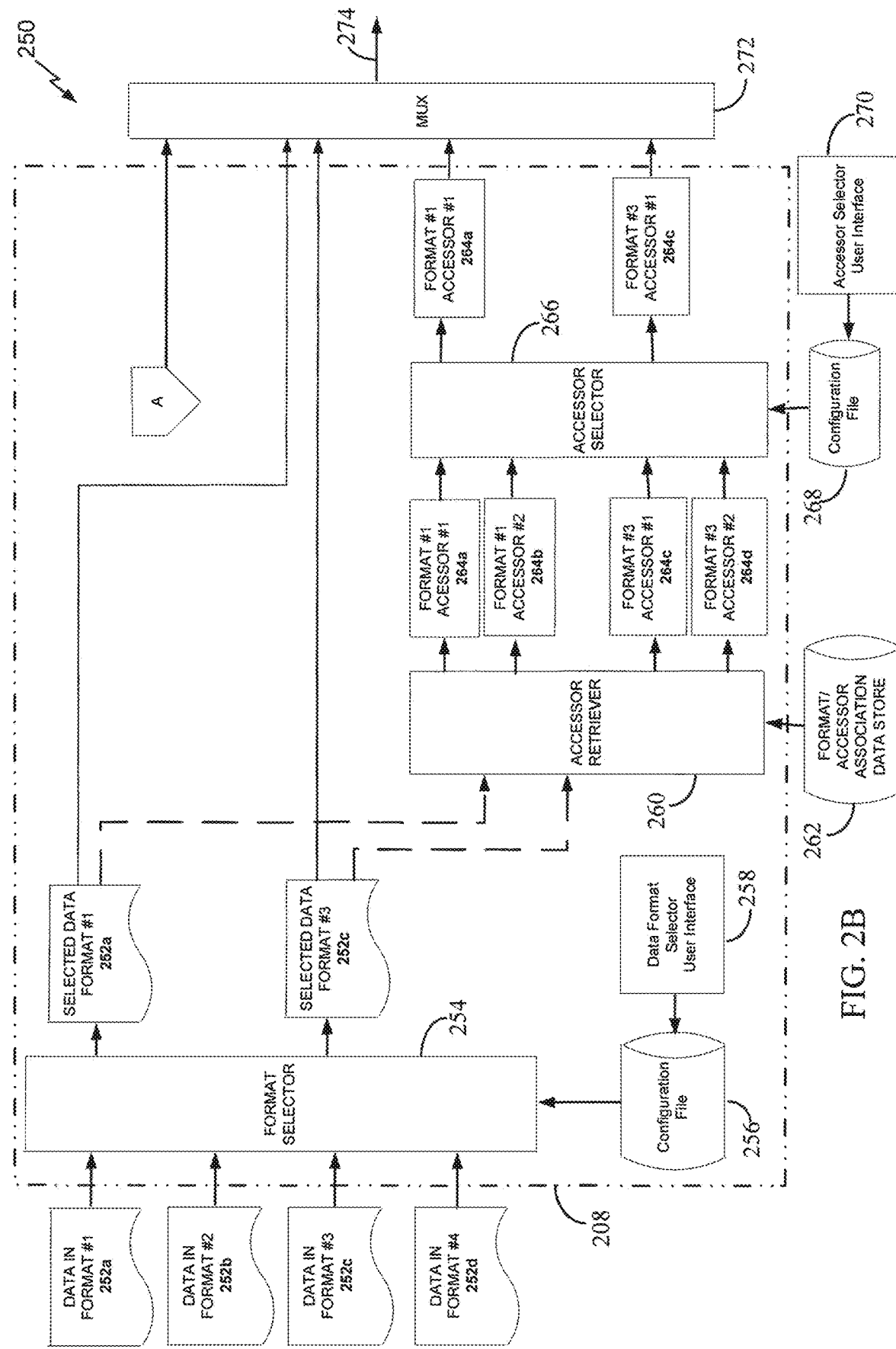
FIG. 2B is a data flow diagram of one exemplary embodiment.

FIG. 2B is a data flow diagram of one exemplary embodiment. The data flow 250 begins at the left with data in four identified data formats 252a-d. The four identified formats 252a-d may be identified in some aspects by the format analyzer 202 discussed above with respect to FIG. 2A. In some aspects, the identified formats 252a-d may be signaled to the accessor functionality selector and generator 208, discussed above with respect to FIG. 2A.

Some aspects of the methods and systems disclosed include a format selector process 254. The format selector process 254 may select a portion or all of the data in the identified formats 252a-d for archival. In some aspects, the selection may be based on input received from a configuration file 256. In some aspects, the configuration file may be populated, directly or indirectly, by a user interface process 258. For example, the user interface process 258 may display the detected formats 252a-d on a display, and receive input from a user, such as via keyboard and/or a pointing device (not shown) to select all or a subset of the identified formats 252a-d for archival. The results of the selection may then be recorded in the configuration file 256. In some aspects, the data format selector user interface 258 may configure the format selector process 254 directly, without going through the configuration file/data store 256. In the example data flow 250, the first and third formats 252a and 252c respectively are selected by the format selector processor 254 for archival. Formats 252b and 252d are not selected for archival. Note that some aspects may not include a format selector process 254. In these aspects, the formats 252a-d may all be received by the accessor retriever process 260, discussed below.

Once the data formats to be archived are known, an accessor retriever process 260 may retrieve one or more accessors associated with each of the selected formats 252a and 252c from a format/accessor association data store 262. In the illustrated data flow 250 of FIG. 2A, the accessor retriever 260 retrieves four accessors 264a-d from the format/accessor association data store 262. Accessors 264a-b are associated with selected format #1 252a in the format/accessor association data store 262. Accessors 264c-d are associated with selected format #3 252c in the format/accessor association data store 262.

In some aspects, the retrieved accessors 264a-d are then received by an accessor selector process 266. The accessor selector process may select only a subset of the accessors retrieved from the format/accessor association data store for archival. The selection may be based, in some aspects, on data read from a configuration file 268. In some aspects, the configuration file is populated, either directly or indirectly, by an accessor selector user interface 270. For example, the accessor selector user interface 270 may display indicators of at least a portion of the retrieved accessors 264a-d on a display device, and receive input that defines which of the retrieved accessors 264a-d are selected for archival. In some aspects, the configuration file/data store 268 may not be present, and the accessor selector user interface 270 may configure the accessor selector 266 directly.

The illustrated data flow 250 shows that format #1 accessor #1 264a and format #3 accessor #1 264c are selected by the accessor selector 266. The selected accessors 264a and 264c are then provided to a multiplexor 272 in some aspects. The selected data formats 252a and 252c are also provided to the multiplexer 272. Selected metadata types, described below with respect to FIG. 2C, and shown in FIG. 2B via off-page reference "A", are also provided to the multiplexer 272. The multiplexor 272 may then output the selected data formats and the corresponding selected accessors for those data formats as a single set of bits 274 to create a container as described above. In some aspects, the multiplexor 272 may also include selected metatype types as part of the single set of bits 274.

Figure 2C:
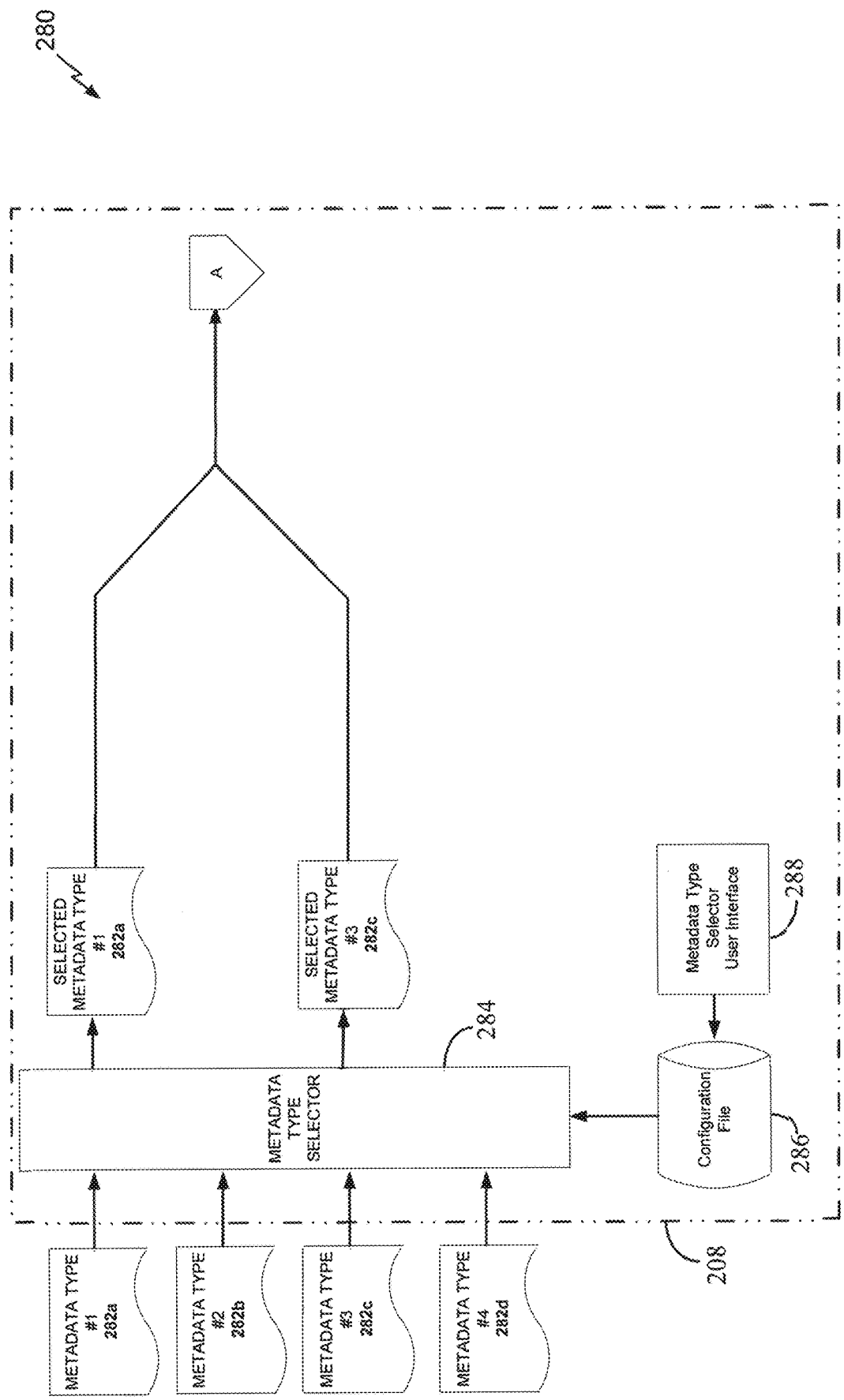
FIG. 2C is a data flow diagram of one exemplary embodiment.

FIG. 2C is a data flow diagram of one exemplary embodiment. The data flow 280 begins at the left with four identified metadata types 282a-d. The four identified metadata types 282a-d may be identified in some aspects by the format analyzer 102 discussed above with respect to FIG. 1. In some aspects, the identified metadata types 282a-d may be signaled to the accessor functionality selector and generator 208, discussed above with respect to FIG. 2A.

Some aspects of the methods and systems disclosed include a metadata type selector process 284. The metadata type selector process 284 may select a portion or all of the identified metadata types 282a-d for archival. In some aspects, the selection may be based on input received from a configuration file 286. In some aspects, the configuration file may be populated, directly or indirectly, by a user interface process 288. For example, the user interface process 288 may display the detected formats 282a-d on a display, and receive input from a user, such as via keyboard and/or a pointing device (not shown) to select all or a subset of the identified metadata type 282a-d for archival. The results of the selection may then be recorded in the configuration file 286.

In some aspects, the metadata type selector user interface 288 may configure the metadata type selector process 284 directly, without going through the configuration file/data store 286. In the example data flow 280, the first and third metadata types 282a and 282c respectively are selected by the metadata type selector processor 284 for archival. Formats 282b and 282d are not selected for archival. These metadata types are provided to the multiplexer 272 discussed above with respect to FIG. 2B via off-page reference "A."

FIG. 3A shows an example graphical user interface 300 for accessor functionality selection. In some aspects, the graphical user interface 300 may implement the accessor selector user interface 270 discussed above with respect to FIG. 2B. In some aspects, the accessor functionality selection accomplished by the user interface of FIG. 3A may be applied to all users of an archival system. Alternatively, the accessor functionality selection accomplished by the user interface 300 of FIG. 3A may be performed on a per user or per group basis in some aspects. For example, in some aspects, a first user may select a first set of accessors to be used in their archivals via user interface 300. A second user may select a second set of accessors to be used during their respective archivals via the user interface 300. In some aspects, the archival selection shown in FIG. 3A may be performed on a per archival or per archival group basis. For example, in some aspects, a user may define an archive and also define a set of accessors to use for data stored to the archive via user interface 300. In these aspects, any files archived to a first archive may utilize first settings defined by the user interface 300. Files archived to a second archive may not utilize the first settings of the first archive, but may instead rely on their own second settings defined by a separate (second) invocation of the user interface 300.

In the example of FIG. 3A, a first accessor, labeled "Accessor 1" 302, indicates the use of a proprietary data interpreter with all of its associated features, which may include not only algorithms for reading the data, but also algorithms for additional display options and manipulation of the data. As shown, the user interface 300 shows the storage requirements of each displayed accessor to the right of the accessor description. For example, the proprietary data accessor 302 might require 6 MB of storage space following functionality generation. Some aspects may display a licensing cost associated with at least some of the displayed accessors (not shown). For example, in these aspects, a licensing cost (per archive, total, per month, etc) may be shown to the left or right of the memory requirements, or may replace the memory requirements in the user interface 200 in some other aspects.

In some aspects, the proprietary data accessor 302 may be a default functionality choice. For example, in some aspects, the first choice or the choice at a top of the list may be automatically selected as a default choice. Alternatively, in some aspects, there may not be a default selection, and the user may be required to make an explicit selection before continuing.

User interface 300 may also show a second data interpreter 304 that may be selected. In some aspects, an entire feature set and associated functionality of "Accessor 2" 304 may be selected by selecting the associated checkbox. Alternatively, when a subset or subsets of features are available, as indicated by the hierarchical lists displayed under "Accessor 2", these subsets of features may be selected by clicking on the checkboxes associated with each feature set. Furthermore, in some aspects, each feature or feature set may be labeled with the storage space requirement following functionality generation as shown. For example, the user may select feature set "Rotating Display" 306 or select the "2D rotation" option 308 or "3D rotation" option 310. If the "3D rotation" option is selected, an additional 0.5 MB of storage will be required, whereas if the full rotation feature set is selected, an additional 0.7 MB would be required.

The feature list shown in FIG. 3A may be populated in part from information from the format analyzer 202. As an example, if the format analyzer 202 examines the data and detects that there are annotations associated with the data, the accessor functionality selector and generator 208 may add the feature option "Annotation Display" 312. In some aspects, the addition of the feature may depend on whether the option is a supported feature. In some aspects, a total storage usage 314 requirement for selected features may be displayed. FIG. 3A is intended to be only an example, and if multiple pieces of content are present in the encoded data stream, additional accessors choices may be displayed. After entry of data on user interface 300 is complete, one or more configuration records may be created based on the selections made in user interface 300. Archival of data may then be based on the one or more configuration records.

Figure 3B:
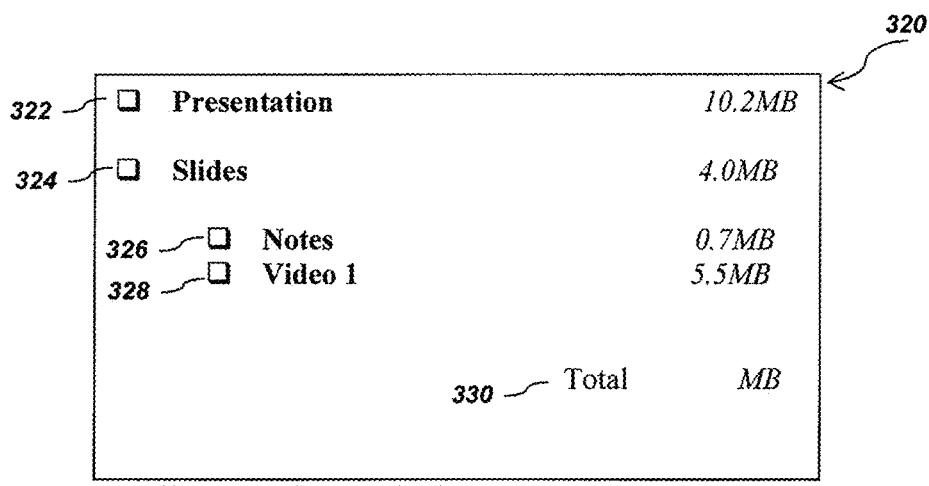
FIG. 3B is an example graphical user interface illustrating a data content selector that performs techniques as described in this disclosure.

An example graphical user interface 320 for digital data content selection is shown in FIG. 3B. This interface may function in a manner similar to that of the accessor functionality selector 300. Using a presentation, such as a PowerPoint format presentation with associated notes and one embedded video clip as an example, a user may select to store the entire presentation with option 322. Alternatively, the user may select only the subset "Slides" 324 or one or more of the subsets "Notes" 326 and "Video 1" 328. The storage space for each subset may be displayed so that the user may make the selection based on the total required 320.

Returning to FIG. 2A, based on the user selection, the accessor functionality selector and generator 208 generates one or more functionalities and maps the one or more functionalities to one or more syntax elements with optional overhead information. The accessor functionality selector and generator 208 further sends information regarding the selected functionality to the optional accessor verifier 210, the optional source/channel/encryption encoder 212, or directly to the format annotator 206. In one embodiment the information corresponds to syntax elements such as codewords. The accessor functionality selector and generator 208 maps each functionality to one or more syntax elements with optional overhead information. The overhead information may correspond to information used by the decoder/interpreter to identify and/or decode the syntax elements such as a header that identifies the data as codewords. In another embodiment, the mapping function is performed by a functionality encoder that is part of a separate module than the decoder functionality generator 208. As an example, the accessor functionality selector and generator 208 may generate or select from algorithms written in a specific language, such as C. The accessor functionality selector and generator 208 or the external functionality encoder may then map the C-language instructions to bytecodes or other codewords with optional overhead information. In a further embodiment the accessor functionality selector and generator 208 sends information regarding the selected functionality or functionalities to the optional accessor verifier 210, the optional source/channel/encryption encoder 212, or directly to the format annotator 206. In a further embodiment the accessor functionality selector and generator 208 may send information regarding the selected data format(s) to the optional accessor verifier 210, the optional source/channel/encryption encoder 212, or directly to the format annotator 206. The information may be transmitted in sequence with the information regarding the selected functionality of a first encoded data stream or may be sent separately from that of a first encoded data stream.

The optional accessor verifier 210 is configured to receive the encoded data from buffer 204 or other suitable storage unit. It is further configured to receive the generated functionality or functionalities and the selected data format(s) from the accessor functionality selector and generator 208, an indication of default or selected reference decoder/interpreter, and user input in the form of a confirmation signal or a confirmation threshold. The accessor verifier 210 instantiates one or more decoders/interpreters using the generated functionality or functionalities received from the accessor functionality selector and generator 208. The accessor verifier further decodes or interprets the received associated portion of encoded data. The accessor verifier 210 further decodes or interprets the received encoded data using the reference decoder/interpreter. The accessor verifier 210 compares the output of the reference decoder/interpreter and the instantiated decoder/interpreter when acting on the associated portion of encoded data and outputs one or more performance indicators.

In some aspects, a user may set one or more thresholds for acceptable performance or may indicate acceptable performance after reviewing the performance indicators. If the accessor verifier 210 determines performance of the generated functionality is acceptable, a control signal is sent to the accessor functionality selector and generator 208 to indicate that the generated functionality should be forwarded to the optional source/channel/encryption encoder 212 or directly to the form annotator 206. If the accessor verifier 210 determines performance of generated functionality is unacceptable a control signal is sent to the accessor functionality selector and generator 208 to indicate that an alternate functionality must be selected or input.

The optional source/channel/encryption encoder 212 is configured to receive the syntax elements and/or optional overhead information from the accessor functionality selector and generator 208 or the optional accessor verifier 210 and to source and/or channel encode and/or encrypt the syntax elements and overhead information. Source coding may include compression and various entropy encoding configurations may be used as would be understood by one of ordinary skill in the art. Various channel encoding configurations may be used as would be understood by one of ordinary skill in the art. Furthermore, joint source-channel coding may be used as would be understood by one of ordinary skill in the art. The source/channel/encryption encoder 212 may then transmit the encoded data to the format annotator 206.

An optional metadata selector 216 is in communication with the format annotator 206. The metadata selector allows metadata to be associated with the encoded data. The metadata may in a form such as text, XML, FOAF, or similar format. Alternatively, the metadata can be in another form such as an image, or voice clip with an optional associated accessor. In another embodiment, the metadata selector may display a checklist list of metadata or metadata fields and permit the user to select a subset of the checklist.

The format annotator 206 is configured to receive the encoded data from the optional buffer 204 or is in direct communication with the storage or other mechanism supplying the encoded data. The format annotator 206 is further configured to receive the syntax elements and optional overhead information directly from the accessor functionality selector and generator 208, or source and/or channel encode and/or encrypted syntax elements and optional overhead information from the source/channel/encryption encoder 212. In one embodiment, the format annotator 206 is configured to act as a multiplexer. Accordingly, the format annotator 206 is configured to multiplex the syntax elements and optional overhead information (source and/or channel encode and/or encrypt or not) with the encoded data and optional metadata to form a single set of bits of data or bitstream corresponding to both pieces of data. In another embodiment, the format annotator 206 keeps the encoded data and syntax elements and optional overhead information (source and/or channel encode and/or encrypt or not) as separate sets of bits of data or bitstreams.

The format annotator 206 then makes the bitstream(s) available to a receiver/decoder or a storage unit. Optionally, the format annotator 206 makes the bitstream(s) available to an optional multiplexer 214. In one embodiment, the optional multiplexer 214 is configured to receive the bitstream(s) from the format annotator 206 and multiplex the bitstream(s) with a second digital data stream. The second digital data stream which is input to the optional multiplexer 214 may be an electronic document, a web page, or other electronic data. In another embodiment, the optional multiplexer 214 is configured to receive the bitstream(s) from the format annotator 206 and multiplex the bitstream(s) with a second digital data stream and overhead. The overhead may consist of information such as synchronization codes, identification information, and additional access mechanism instructions. The optional multiplexer 214 then outputs the multiplexed bitstream to a receiver/decoder or a storage unit. For example, the format annotator 206 may output the bitstream(s) or the optional multiplexer 214 may output the multiplexed bitstream to a storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media (e.g., DVD, Blu-Ray, CD, etc.), and the like. The storage medium may be accessible by the receiver/decoder. Additionally or alternatively, the format annotator 206 outputs the bitstream(s) or the optional multiplexer 214 outputs the multiplexed bitstream for wired or wireless transmission to the receiver/decoder. For example, the format annotator 206 outputs the bitstream(s) or the optional multiplexer 214 outputs the multiplexed bitstream to an appropriate transceiver and/or modem for transmitting the bitstream(s) to the receiver/decoder over one or more communication channels. Any known wired and/or wireless protocol may be used such as, IEEE 802.11 standards, including IEEE 802.11(a), (b), or (g), the BLUETOOTH standard, CDMA, GSM, TDMA, Ethernet (IEEE 802.3), and/or USB.

Note that while FIG. 2A shows the accessor verifier 210 receiving data from the buffer 204 and in communication with the accessor functionality selector and generator 208, in some other aspects (not shown), the accessor verifier may instead receive data from the format annotator 206 or the multiplexer 214. For example, in some aspects, the accessor verifier 210 may read an archive including both data and an accessor for the data. The data and the accessor may be extracted from the archive. The accessor may then be instantiated and provided with the data from the archive as input. A separate reference accessor may also be configured to receive the input data from the archive. The candidate accessor and reference accessor may both be configured to generate outputs, which are compared. If the results do not meet one or more quality conditions, the archive may be regenerated by the data analyzer/functionality generator 200. The data analyzer/functionality generator 200 may select a different candidate accessor in response to the failure of the verification as part of the archive regeneration. Aspects of the accessor verifier 210 are discussed below with respect to FIG. 4.

Figure 4:
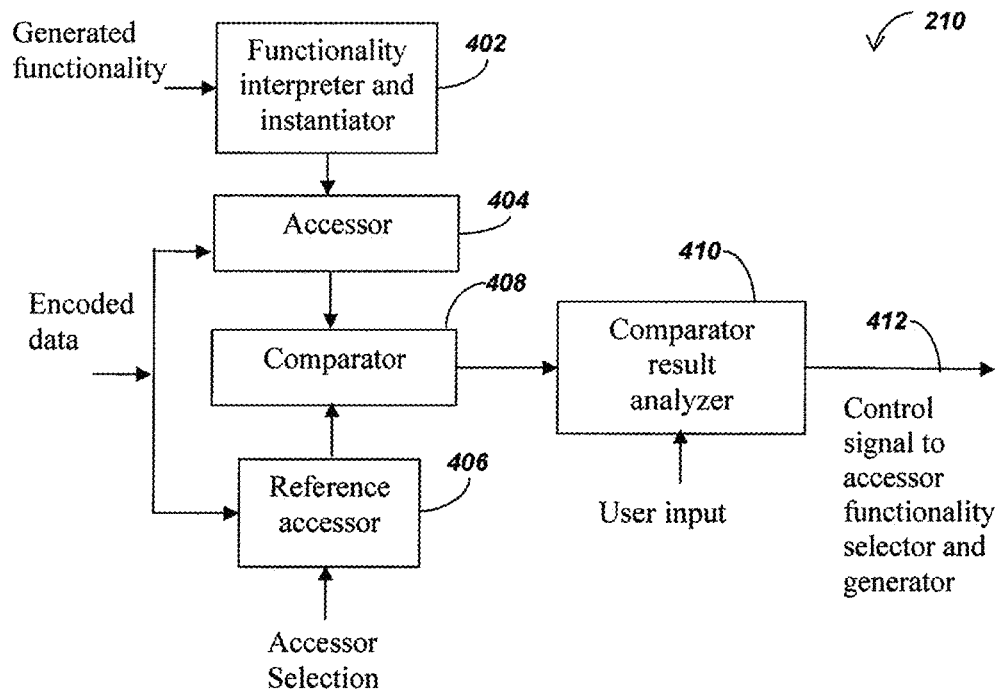
FIG. 4 is a block diagram illustrating an accessor verifier that performs techniques as described in this disclosure.

FIG. 4 is a data flow diagram of an access verifier process as may be performed within the accessor verifier 210 discussed above with respect to FIG. 2A. The accessor verifier 210 includes a functionality interpreter and instantiator in communication with an accessor 404. In some aspects, the accessor 404 may be any of the selected accessors 264a or 264c of FIG. 2B. The accessor verifier 210 further includes one or more reference accessors 406. The accessor 404 and the reference accessor 406 are further in communication with a comparator 408. In some aspects, each of the accessor 404 and reference accessor 406 may decode the encoded data and transmit one or more indications of the decoded data (including, in some aspects, the decoded data itself) to the comparator 408. The comparator is configured to compare input received from each of the accessor 404 and reference accessor 406. The comparator 408 is in communication with the comparator result analyzer 410. The functionality of components of the accessor verifier 210 is described in further detail below.

The functionality interpreter and instantiator 402 is configured to receive one or more generated functionality output by an accessor functionality selector generator 208 such as discussed above with respect to FIG. 2A. The functionality interpreter and instantiator 402 receives the functionality or functionalities data bitstream, which includes syntax elements and optional first and second overhead information, as discussed above. The functionality interpreter and instantiator 402 may map syntax elements to the correct functionality. For example, the syntax elements may map to functionality such as processing elements, structures, and or code segments. Based on these syntax elements for each generated functionality, the functionality interpreter and instantiator 402 generates accessor 404. In the case of a software or firmware system, the accessor 404 may be instantiated by functionality interpreter and instantiator 402 by just-in-time compilation, ahead-of-time compilation, interpretation, or similar method. In the case of a hardware system, such as an FPGA or other reconfigurable hardware, the accessor 404 may be instantiated by functionality interpreter and instantiator 402 by interconnecting hardware. In a further embodiment, if functionality data corresponding to a second encoded data stream are generated by the accessor functionality selector and generator 208 then the functionality interpreter and instantiator 402 may be configured to receive the functionality data corresponding to the second stream. Further, the functionality interpreter and instantiator 402 may be configured to process functionality data corresponding to multiple streams in serial or in parallel.

The accessor 404 is configured by the functionality interpreter and instantiator 402 as discussed above. The accessor 404 further receives the digital data to be accessed according to the received functionality. A reference accessor 406 corresponding to each generated functionality is provided or in some aspects indicated by a user. The reference accessor also receives the enoded digital data. The accessor 404 decodes the encoded data and either outputs the decoded data or outputs a set of tests of selected features of the accessor using the encoded data. As an example, if the encoded data are audio with embedded lyrics, the accessor 404 may output a set of audio samples. Alternatively, if a generated functionality is supplied to decode and display the embedded lyrics, ASCII text may be output. As another example, if the encoded data are scientific data and the generated functionality includes the feature of displaying and rotating the data by 30 degrees, the accessor may output the data and an image of the rotated data.

The reference accessor 406 decodes or interprets the encoded data and either outputs the decoded/interpreted data or outputs a set of tests of selected features of the reference accessor using the encoded data. These decoded/interpreted data or set of tests of selected features should correspond to the output of accessor 404. In a further embodiment, the reference accessor 406 may be configured to process multiple encoded data streams in serial or in parallel. The reference accessor 406 may be generated in the same manner as accessor 404 or may be previously instantiated. The reference accessor 406 may comprise a field programmable gate array (FPGA) or other suitable configurable circuitry or may comprise one or more general purpose or specialized processors.

The comparator 408 receives the outputs of the accessor 404 and the reference accessor 406 and performs comparisons of the outputs. As an example, the comparison may be performed on a sample-point-by-sample-point basis or may be a subjective quality comparison. The comparator outputs the results of the comparisons of the outputs to the comparator result analyzer 410.

The comparator result analyzer 410 receives the outputs of the comparator 408. Upon determination of acceptable results the comparator result analyzer sends a control signal to the accessor functionality selector and generator 208 of FIG. 2A to indicate that the generated functionality should be transmitted to the optional encoder 212 or the format annotator 206. Upon determination of unacceptable results the comparator result analyzer sends a different control signal to the accessor functionality selector and generator 208 of FIG. 2A to indicate that new accessor functionality should be selected or supplied and generated.

In some aspects, the comparator result analyzer 410 may further receive input from a user or a configuration data store. In some aspects, the input may be in the form of one or more thresholds for acceptable performance or it may be in the form of direct indication of acceptable quality. For the latter, the comparator result analyzer 410 may output numeric, audible, or pictoral comparator results to an output device. In some interactive aspects, the output may be provided on an electronic display for a user to review and evaluate. In other aspects, the output may be provided to a stable storage, such as a database, file or other storage device.

Figure 5:
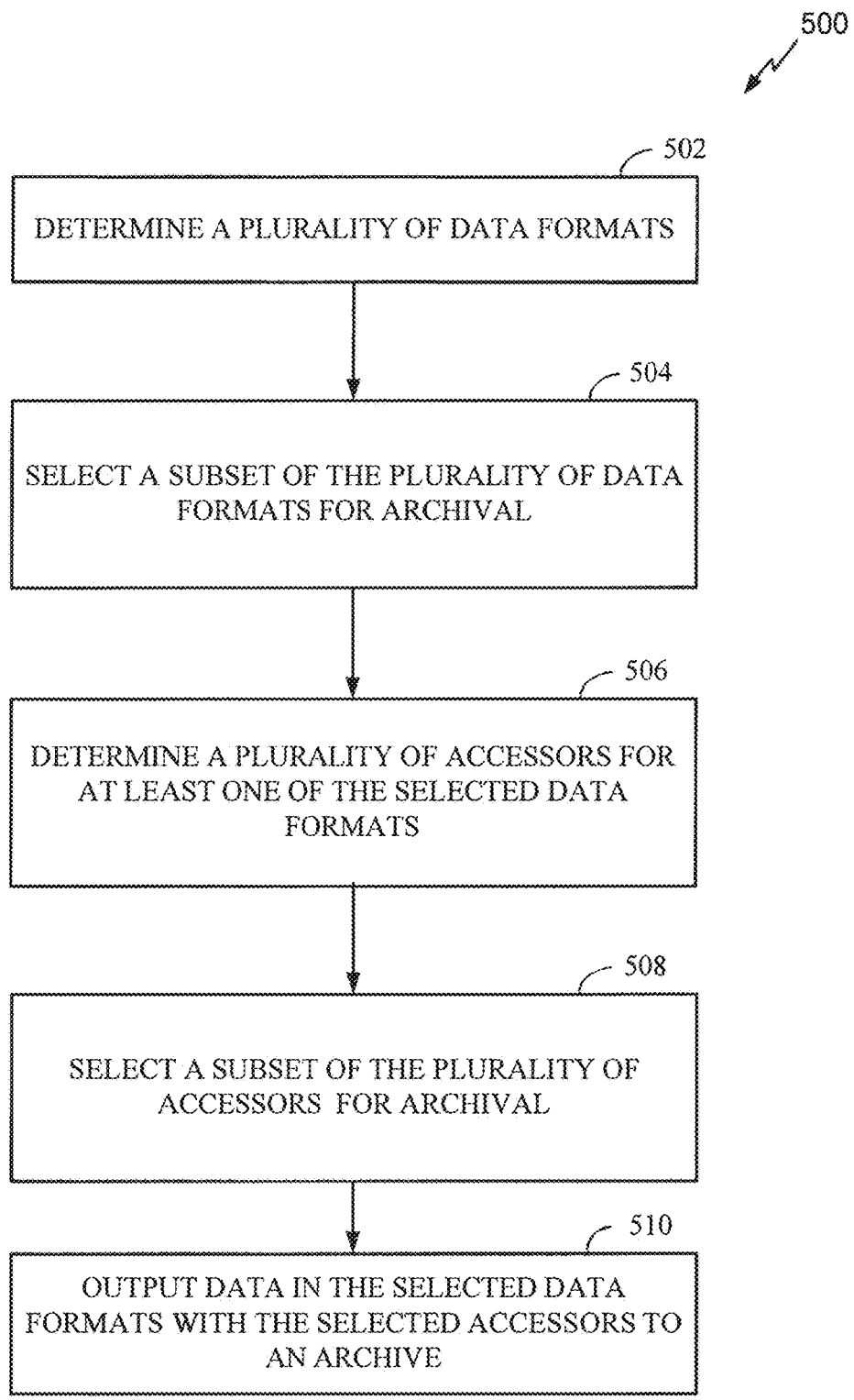
FIG. 5 is a flowchart of a method for archiving data.

FIG. 5 is a flowchart of a method for archiving data. In some aspects, the method 500 may be performed by instructions included in the accessor functionality selector and generator 208, discussed above with respect to at least FIG. 2A. In some aspects, the method 500 may be performed by instructions that configure an electronic hardware processor to perform the functions described below.

Method 500 provides a mechanism for selection of accessors for archival purposes. As discussed above, constraints differ across archival operating environments. In some environments, fidelity of an archive is of upmost importance, while the size of the archive is secondary to fidelity. Other operating environments may be more cost sensitive, and may be more willing to trade off some fidelity in the archive for cost effective space consumption. Method 500 enables this variation across operating environments.

In block 502, a plurality of data formats are determined. In some aspects, block 502 may be performed by the format analyzer 202, discussed above with respect to FIG. 2A. In some other aspects, the plurality of data formats may be determined from, for example, a database of known configuration formats, that is unrelated to any specific data stream.

In block 504, a subset of the plurality of data formats are selected for archival. As discussed above with respect to FIG. 2B, in some aspects, the selection of data formats may be accomplished by a user interface that displays at least a portion of the plurality of data formats on a display, and allows input to be received from a user that defines a selection of the subset of the plurality of data formats. In some other aspects, no user interface may be presented. Instead, the selection of the subset of data formats may be controlled by a data store, such as a file or a database. For example, a system may be configured to only archive the subset of selected data formats programmatically, without use of a user interface. In some aspects, block 504 may not be performed. In these aspects, all of the plurality of data formats in block 502 may be considered in block 506, discussed immediately below. In some aspects, block 504 may be performed by the format selector process 254 shown in FIG. 2B above.

In block 506, a plurality of accessors for at least one of the selected data formats is determined. In some aspects, zero or more accessors for each of the set of selected formats may be determined in block 506. As the example of FIG. 2B illustrates, in some aspects, a datastore 262 may store an association between data formats and one or more accessors. The one or more accessors (264*a-d* in the example of FIG. 2B) may be stored in an accessor library in some aspects. Based on the associations stored in the datastore 262, one or more accessors for each of the selected data formats may be determined (by the accessor retriever process 260 in the example of FIG. 2B).

In block 508, a subset of the plurality of accessors are selected for archival. For example, in some aspects, a user interface, such as user interface 300 shown in FIG. 3A, may facilitate selection of a subset of the plurality of accessors. For example, in some aspects, indicators of one or more of a memory size requirement for an accessor, a total memory size requirement for selected accessors, and/or intellectual property rights costs associated with one or more displayed accesors may be displayed on an electronic display. Input may then be received via either the user interface 300 or 320 that defines the selected accessors. For example, a user may select, via check boxes or other controls, which accessors they wish to include in their archive.

In some other aspects, the subset of accessors may be selected based on input from a configuration datastore, such as a database or configuration file, such as configuration file 268 of FIG. 2B. In some aspects, block 508 is performed by the accessor selector process 266 of FIG. 2B.

In block 510, data using the selected data formats and the selected accessors are output to an archive. In some aspects, the data using the selected data formats and the selected accessors are multiplexed together within a data stream, for example, as a single set of bits. They may be output to a single file or database record, such that both the data and selected accessors can be referenced using a single identifier, such as a name. In some aspects, an archive may be a write once memory, such as a CD-ROM. In some other aspects, an archive may be a back-up device, such as a network attached storage (NAS). In some aspects, an archive may be any stable storage device.

Method 500 may also include determination of a plurality of metadata formats. For example, in some aspects, the format analyzer 202 of FIG. 2A may analyze a data stream and identify one or more types of metadata within the stream. In some aspects, a subset of the identified metadata types may be selected for archival. For example, in some aspects, a user interface may be displayed with indicators for at least a portion of the identified metadata types. Input may be received by the user interface indicating which of the portion of identified metadata types are selected for archival. In some other aspects, selection of the metadata types may be accomplished by receiving input from a datastore, such as a database or a configuration file. For example, a database or configuration file may indicate a list of metadata types selected for archival. Method 500 may obtain the list of selected metadata types and select the types indicated.

In these aspects, block 510 may output the selected metadata types with the selected data formats and the selected accessors to an archive. In some aspects, the selected metadata, data formats, and accessors are output as a single set of bits as discussed above.

Some aspects of method 500 include an accessor verification process, as described above with respect to FIG. 4. For example, in some aspects, method 500 may include instantiating one or more of the selected accessors, and comparing one or more output(s) of the instantiated accessors to output(s) of one or more corresponding reference accessor(s). In some aspects, the comparison may generate differences between corresponding outputs of instantiated accessor(s) and reference accessor(s). The differences may be evaluated against one or more threshold to determine whether the selected accessors provide an archive of adequate fidelity with respect to the data formats (which may have been selected in block 504) being archived. In some aspects, data derived from the differences may be displayed on a display, to facilitate evaluation by a user. Input may then be received indicated whether the archival process should proceed as configured, or if the configuration should be updated, perhaps to provide higher fidelity accessors for the archival.

The technology is operational with numerous other general purpose or special purpose computing system environments or configurations. Examples of well known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), personal area network (PAN), or Wide Area Network (WAN) may be a home or corporate computing network, including access to the Internet, to which computers and computing devices comprising the system are connected. In one embodiment, the LAN conforms to the Transmission Control Protocol/Internet Protocol (TCP/IP) industry standard.

As used herein, data and digital data refer to images, graphics, sounds, video, animations, electronic documents, scientific data, or any other digital data type data that is entered into the system.

As used herein, encoded digital data refers to data that are stored or held in a data format, which may be compressed or uncompressed.

As used herein, decode refers to decompression, interpretation, playback or conversion.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A method of automatically constructing a platform-independent decoder for encoded digital data encoded in a particular format, the method comprising:

receiving the encoded digital data at a decoding functionality selector;

receiving a selection of decoding functionalities from a user from an input device;

utilizing the decoding functionality selector to initiate a process for identifying one or more platform-independent decoding functionalities for decoding the encoded digital data from a library of platform-independent decoding functionalities in accordance with the received selection;

utilizing the decoding functionality selector to select the identified one or more platform-independent decoding functionalities;

utilizing a decoding functionality generator in communication with the decoding functionality selector to generate at least a functional portion of the platform-independent decoder, including the one or more selected decoding functionalities, based at least in part on the automatic selection of the one or more decoding functionalities by the decoding functionality selector;

utilizing a decoding functionality verifier to:

instantiate the at least functional portion of the platform-independent decoder, test the ability of the instantiated functional portion of the platform-independent decoder to accurately decode at least a predetermined portion of the encoded digital data, and based at least in part on a passing result of the test, generate a signal configured to cause at least one of the decoding functionality generator and the decoding functionality verifier to output the at least functional portion of the platform-independent decoder and the decoded predetermined portion of the encoded digital data.

* * * * *